(12) United States Patent
Vaidya et al.

(10) Patent No.: US 10,012,488 B2
(45) Date of Patent: *Jul. 3, 2018

(54) LONG FIBER THERMOPLASTIC THIN-WALLED AEROSHELLS FOR MISSILE APPLICATIONS AND METHODS OF MANUFACTURE

(71) Applicant: The UAB Research Foundation, Birmingham, AL (US)

(72) Inventors: Uday Vaidya, Birmingham, AL (US); J. Barry Andrews, Birmingham, AL (US); Selvum Pillay, Birmingham, AL (US); Haibin Ning, Birmingham, AL (US)

(73) Assignee: THE UAB RESEARCH FOUNDATION, Birmingham, AL (US)

( * ) Notice: Subject to any disclaimer, the term of this patent is extended or adjusted under 35 U.S.C. 154(b) by 321 days.

This patent is subject to a terminal disclaimer.

(21) Appl. No.: 14/288,640

(22) Filed: May 28, 2014

(65) Prior Publication Data

US 2015/0253116 A1    Sep. 10, 2015

Related U.S. Application Data

(63) Continuation of application No. 12/761,821, filed on Apr. 16, 2010, now Pat. No. 8,846,189.

(Continued)

(51) Int. Cl.
*B64C 1/00* (2006.01)
*F42B 12/76* (2006.01)
*B29C 70/46* (2006.01)
*B29C 70/12* (2006.01)
*B29C 43/00* (2006.01)

(Continued)

(52) U.S. Cl.
CPC ............ *F42B 12/76* (2013.01); *B29C 43/006* (2013.01); *B29C 45/0005* (2013.01); *B29C 70/12* (2013.01); *B29C 70/46* (2013.01); *B29C 43/003* (2013.01); *B29C 2045/0006* (2013.01); *B29K 2077/10* (2013.01); *B29L 2031/3097* (2013.01);

(Continued)

(58) Field of Classification Search
CPC .. B64C 1/00; D04H 1/00; B32B 27/04; B32B 27/12; B29C 47/00; B29C 43/006; B29C 45/0005; B29C 70/12; B29C 70/46; B29C 2045/0006; B29D 22/00; B29D 23/00; B29B 1/08; F42B 12/76; Y02T 50/433; B29L 2031/3097
USPC ........... 244/120, 133, 119; 428/292.1, 297.4, 428/36.9

See application file for complete search history.

(56) References Cited

U.S. PATENT DOCUMENTS 2,003,433 A * 6/1935 Ford ............................... 244/55
4,240,857 A * 12/1980 DellaVecchia et al. ...... 156/209

(Continued)

OTHER PUBLICATIONS

"METAShield—Hot Metallic Aeroshell Concept for RLV/SOV", NASA, Jul. 2003.*

(Continued)

*Primary Examiner* — Assres H Woldemaryam
(74) *Attorney, Agent, or Firm* — Thomas Horstemeyer, LLP (57) ABSTRACT

Aeroshells and methods for manufacturing aeroshells are provided. In this regard, a representative aeroshell for a missile formed of a long fiber thermoplastic composite exhibits a wall thickness of no greater than approximately 0.070".

19 Claims, 6 Drawing Sheets

Related U.S. Application Data (60) Provisional application No. 61/170,331, filed on Apr. 17, 2009.

(51) Int. Cl.
  B29C 45/00 (2006.01)
  B29K 77/00 (2006.01)
  B29L 31/30 (2006.01)

(52) U.S. Cl.
  CPC ...... *Y02T 50/433* (2013.01); *Y10T 428/24994* (2015.04); *Y10T 428/249924* (2015.04)

(56) References Cited

U.S. PATENT DOCUMENTS

| | | | |
|---|---|---|---|
| 4,269,884 A * | 5/1981 | DellaVecchia et al. | 428/131 |
| 4,612,238 A * | 9/1986 | DellaVecchia et al. | 442/180 |
| 5,662,293 A * | 9/1997 | Hower et al. | 244/133 |
| 5,672,309 A * | 9/1997 | Masui | B29C 70/467 264/257 |
| 5,945,643 A * | 8/1999 | Casser | 181/290 |
| 6,488,871 B2 | 12/2002 | Nomura et al. | |
| 6,863,942 B2 * | 3/2005 | Ren et al. | 428/36.9 |
| 6,883,843 B2 * | 4/2005 | Van Damme et al. | 293/120 |
| 7,334,373 B2 * | 2/2008 | Richards | 52/309.1 |
| 8,048,815 B2 * | 11/2011 | Kubota et al. | 442/286 |
| 2002/0094428 A1 * | 7/2002 | Nomura et al. | 428/297.4 |
| 2004/0046273 A1 * | 3/2004 | Abrams et al. | 264/40.5 |
| 2005/0059309 A1 * | 3/2005 | Tsotsis | B29B 11/16 442/381 |
| 2006/0035548 A1 * | 2/2006 | Goto | B29B 15/122 442/65 |
| 2006/0112560 A1 | 6/2006 | Van Damme et al. | |
| 2007/0063095 A1 * | 3/2007 | Bittle et al. | 244/3.21 |
| 2007/0261543 A1 * | 11/2007 | Elder | F41B 6/006 89/8 |
| 2009/0277994 A1 * | 11/2009 | Lobato | B64C 1/061 244/119 |
| 2010/0024964 A1 * | 2/2010 | Ingram, Jr. | B29C 53/587 156/189 |
| 2010/0043955 A1 * | 2/2010 | Hornick | B29C 65/5057 156/182 |
| 2010/0065688 A1 * | 3/2010 | Wood | B29C 65/562 244/131 |

OTHER PUBLICATIONS

"Injection moulding of long glass fibre reinforced polyamide 6-6: guidelines to improve flexural properties", Jun. 2007.*
Lafranche et al. "Injection moulding of long glass fibre reinforced polyamide 6-6: guidelines to improve flexural properties", 2007.*
Seeling et a. "Modeling and crash simulation of long-fibre-renforced thermoplastic", 2008.*
Parthasarathy, "Processing and Characterization of Long Fiber Thermoplastics", 2008.*
ETD Administrator; Nov. 30, 2017; via the internet; 4 pages; https://secure.etdadmin.com/cgi-bin/admin/vwpubAgree?siteId=134;submissionId=1588.

* cited by examiner

| ZONE | 1 | 2 | 3 | 4 | 5 | 6 | 7 | 8 | 9 | 10 | KNIFE | UPPER MOLD | BOTTOM MOLD |
|---|---|---|---|---|---|---|---|---|---|---|---|---|---|
| TEMPERATURE (°F) | 520 | 530 | 550 | 560 | 560 | 580 | 580 | 600 | 600 | 610 | 610 | 250 | 250 |
| MOLDING PRESSURE (TONS) | 400 | | | | | | | | | | | | |
| PRESS CLOSING RATE (MM/SEC) | 254 | | | | | | | | | | | | |

FIG. 7

| ZONE | 1 | 2 | 3 | 4 | 5 | 6 | 7 | 8 | 9 | 10 | KNIFE | UPPER MOLD | BOTTOM MOLD |
|---|---|---|---|---|---|---|---|---|---|---|---|---|---|
| TEMPERATURE (°F) | 530 | 540 | 550 | 560 | 570 | 590 | 600 | 620 | 630 | 640 | 640 | 290 | 290 |
| MOLDING PRESSURE (TONS) | 400 | | | | | | | | | | | | |
| PRESS CLOSING RATE (MM/SEC) | 254 | | | | | | | | | | | | |

FIG. 8

| ZONE | 1 | 2 | 3 | 4 | 5 | 6 | 7 | 8 | 9 | 10 | KNIFE | UPPER MOLD | BOTTOM MOLD |
|---|---|---|---|---|---|---|---|---|---|---|---|---|---|
| TEMPERATURE (°F) | 520 | 530 | 550 | 550 | 560 | 580 | 590 | 610 | 610 | 625 | 625 | 275 | 275 |
| MOLDING PRESSURE (TONS) | 400 | | | | | | | | | | | | |
| PRESS CLOSING RATE (MM/SEC) | 254 | | | | | | | | | | | | |

FIG. 9

| | DESCRIPTION | TENSILE MODULUS (GPa) | TENSILE STRENGTH (MPa) | DENSITY (g/cm³) | FLEXURAL MODULUS (GPa) | FLEXURAL STRENGTH (MPa) |
|---|---|---|---|---|---|---|
| 40% C-PPS LFT | 0.5" PELLETS | 18 | 51 | 1.49 | 14 | 189 |
| 40% C-PAA LFT | 1" PELLETS | 32 | 84 | 1.38 | 12 | 201 |
| 30% C-PAA LFT | 1" PELLETS | 20 | 90 | 1.35 | 11 | 170 |
| 40% C-PBT LFT | 1" PELLETS | 15 | 85 | 1.47 | 15 | 384 |
| 40% C-TPU LFT | 1" PELLETS | 17 | 35 | 1.38 | 17 | 163 |

FIG. 10

LONG FIBER THERMOPLASTIC THIN-WALLED AEROSHELLS FOR MISSILE APPLICATIONS AND METHODS OF MANUFACTURE

CROSS REFERENCE TO RELATED APPLICATION

This utility application is a continuation of and claims the benefit of U.S. Non-Provisional patent application Ser. No. 12/761,821, filed Apr. 16, 2010, which also claims the benefit of and priority to U.S. Provisional Patent Application 61/170,331, which was filed on Apr. 17, 2009, and which is incorporated by reference herein in its entirety.

STATEMENT REGARDING FEDERALLY SPONSORED RESEARCH AND DEVELOPMENT

The U.S. Government may have an interest in the subject matter of this disclosure as provided for by the terms of U.S. Army Research Lab Cooperative Agreement W911NF-04-2-0018 and contract number W31P4Q-08-0039 awarded by U.S. Army Aviation and Missile Research Development and Engineering Center.

BACKGROUND

Technical Field

The disclosure relates to the manufacture of thermoplastic components.

Description of the Related Art

Various components are conventionally formed of metal, such as those that are subjected to significant mechanical stresses during use. By way of example, exterior components of aircraft and missiles are typically formed of metal. In such an implementation, aluminum is oftentimes the metal of choice in that aluminum offers relatively high strength at a low weight.

SUMMARY

Aeroshells and method for manufacturing aeroshells are provided. In this regard, an exemplary embodiment of an aeroshell for a missile formed of a long fiber thermoplastic composite exhibits a wall thickness of no greater than approximately 0.070".

Another exemplary embodiment of an aeroshell for a missile formed of a long fiber thermoplastic composite comprises the long fiber thermoplastic composite exhibiting a fiber weight fraction in a range of about 10% to 50% and fiber lengths ranging from about 10 to 25 mm.

An exemplary embodiment of a method for manufacturing an aeroshell for a missile comprises forming the aeroshell with a long fiber thermoplastic composite such that the aeroshell exhibits a wall thickness of no greater than approximately 0.070".

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Before providing a more detailed description, it is to be understood that this disclosure is not limited to the particular embodiments described, as such may vary. It is also to be understood that the terminology used herein is for the purpose of describing particular embodiments only, and is not intended to be limiting.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs.

All publications and patents that may be cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, materials science, physics, engineering, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

In general, a missile can be retrofitted with a Trajectory Correction Kit (TCK). A TCK provides guidance to the missile to hit the intended target and reduce collateral damage. The TCK body is comprised of an aeroshell that is exposed to the outer environment. The aeroshell is mounted to a baseplate, to which the electronics, wires and other components are mounted. The aeroshell and the baseplate together are referred to as a TCK set. The TCK is subjected to elevated temperature, pressure loads, vibration and noise and bearing loads.

In this regard, aeroshells for a TCK set have been designed, modeled, analyzed and produced with long fiber thermoplastic (LFT) composite materials. The aeroshells can be produced by long fiber thermoplastic extrusion-compression molding (ECM) or long fiber thermoplastic injection molding (IM) processes.

Long fiber thermoplastic composites have a thermoplastic polymer matrix that melts when heated beyond its melting/softening temperature. The material flows under pressure, carrying fibers with the flowing polymer to fill a cavity (e.g., a cavity of a mold). A part is formed when the polymer cools and solidifies. Long fiber thermoplastic aeroshells may be superior to metal (e.g., aluminum) aeroshells because they are lighter, cheaper, their thermal conductivity can be tailored, and they vibrate less and possess high strength and stiffness.

For instance, thin walled carbon fiber parts in long fiber lengths of 12 mm to 25 mm are not believed to have been produced in thin walled structures (wall thickness of approximately 0.070" (±0.030" to 0.100"±0.060") for 30% (range 10% to 50% fiber weight fraction, preferably 20% to 40%) fiber weight fraction. Notably, fiber weight fraction is the amount of fiber content by weight in a material system. Generally, controlling the fiber weight fraction controls the part performance in terms of strength, stiffness and other properties.

Failure to use long fiber thermoplastics to form aeroshells in the prior art may be attributed to several factors. For example, conventional wisdom indicates that the part is too thin to distribute fibers uniformly. Additionally, the material may be too highly viscous and difficult to flow particularly at high fiber loading and this prevents the mold cavity from filling. Also, fibers (e.g., carbon fibers) can dissipate heat rapidly; hence, the fiber filled polymer charge can freeze before filling the cavity, which further complicates filling. By improving polymer flow with respect to the fiber, for example, a mold cavity can be fully filled without compromising polymer quality or fiber length. In general, as the ratio of the part surface area to its wall thickness increases, flow of the material in the mold becomes challenging. This is due to the material freezing upon contact with the mold surface, and lower amounts of molten polymer become available to fill the extremities of the cavity.

Also, the idea of using a thermoplastic in a high temperature application is generally counter intuitive. In most cases, the designers automatically discard the notion. However, by controlling the fiber loading, type of fiber and the matrix properties, this limitation can be overcome.

The LFT includes materials, such as, but not limited to, thermoplastic polyurethanes, polypropylene, polyethylene (PE), polyamide (PA) based polymers, poly aryl amide (PAA), polystyrene, acrylonitrile butadiene styrene (ABS), styrene acrylonitrile (SAN), polyethersulphone (PES), polyetherimide (PEI), polyimide (PI), polyphenylene sulfide (PPS), polyetheretherketone (PEEK), polyetherketone (PEK), and combinations thereof, in conjunction with reinforcement fibers or materials such as aramid fibers (e.g., KEVLAR™, ZYLON™, TWARON™, and the like) polyethylene fibers (e.g., SPECTRA™, DYNEEMA™, and the like), polypropylene and nylon fibers, glass fibers or materials, carbon fibers, basalt fibers and combinations thereof.

The fibers in the LFT are discontinuous fibers as opposed to continuous fibers. The LFT has fiber lengths ranging from about 10 to 50 mm, preferably from about 10 to 25 mm for ECM, and preferably from about 10 to 15 mm for IM. The LFT can include fiber weight fraction in a range of about 10 to 50 weight % in the LFT for any of these fiber lengths, preferably from about 20% to 40%, preferably approximately 30%.

Characteristics of the LFT material include, but are not limited to, fiber length and aspect ratio (length/diameter) that can be varied to optimize the strength, modulus, and impact properties of the composite as well as influence other mechanical and physical properties of the composite structure.

Figure 1:
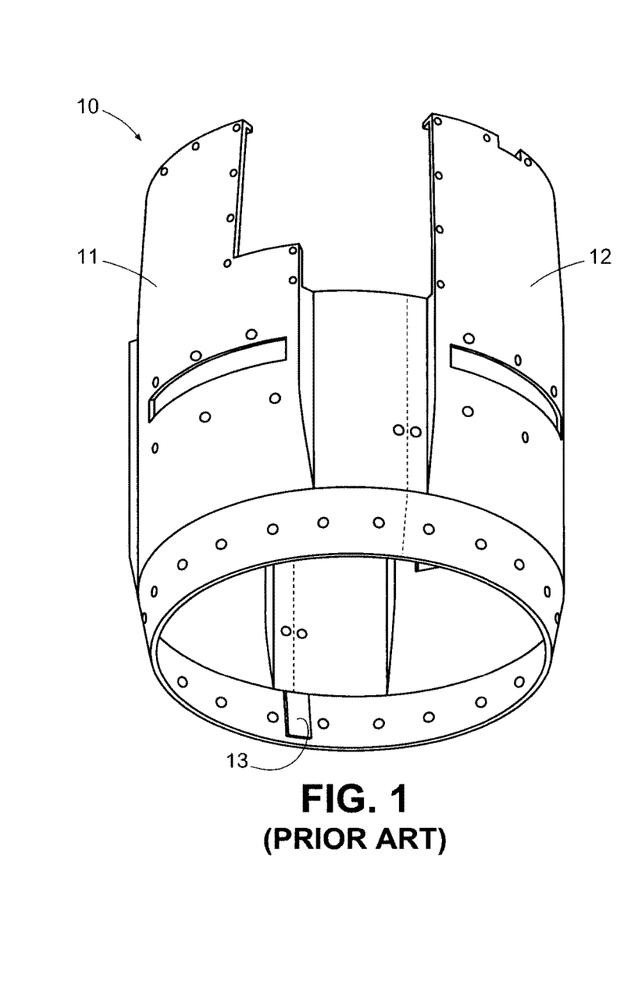
FIG. 1 depicts a prior art aeroshell formed of aluminum.
Figure 2:
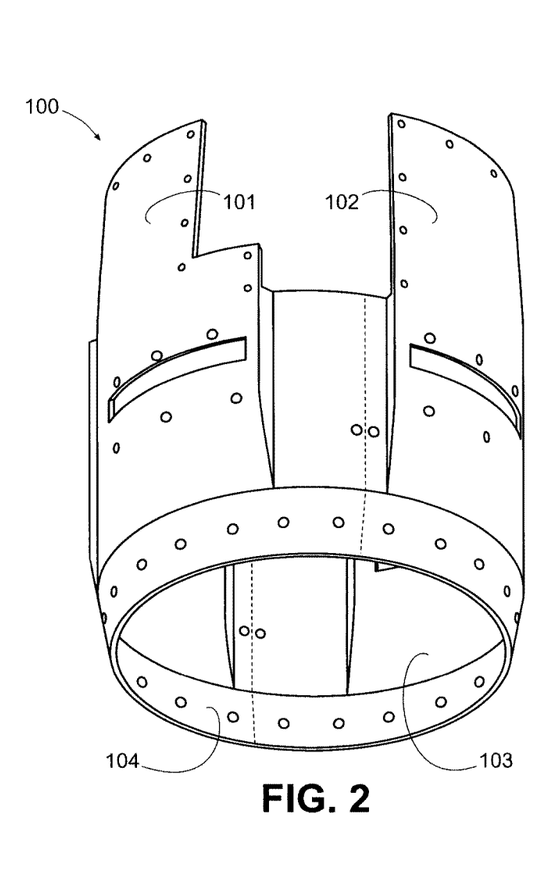
FIG. 2 depicts an exemplary embodiment of a long fiber thermoplastic (LFT) aeroshell.

FIG. 1 depicts a prior art aeroshell 10 formed of aluminum, whereas FIG. 2 depicts an exemplary embodiment of a long fiber thermoplastic composite aeroshell.

As shown in FIG. 2, aeroshell 100 is generally cylindrical and exhibits a substantially circular cross section. Average dimensions of this embodiment include a length of approximately 12 inches and a diameter of approximately 10 inches. Aeroshell 100 is formed of multiple longitudinal sections. In this embodiment, four such sections (sections 101, 102, 103 and 104) are provided. Each of the sections is joined to an adjacent section by mechanical fasteners. For example, bolts (not shown) are used to fasten adjacent sections via corresponding apertures.

In the embodiment of FIG. 2, note that undercuts (e.g., flange 13 have been eliminated and hole locations have been moved farther away from the peripheral edges for assembly. Note also that the aluminum aeroshell of FIG. 1 is produced in two halves (i.e., halves 11 and 12), in contrast to the aeroshell of FIG. 2, which is produced in four quadrants.

Figures 3A, 3B:
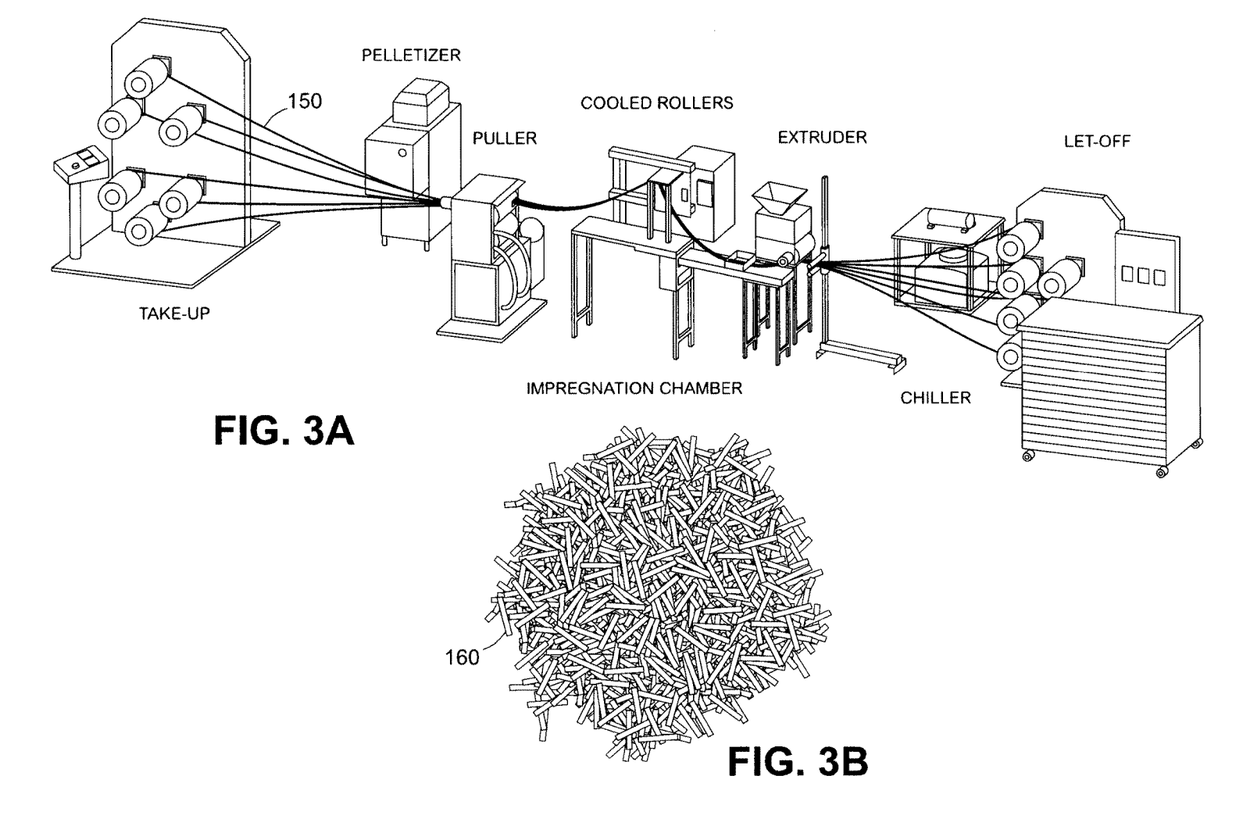
FIGS. 3A-3D depict basic process components/steps for forming an embodiment of an LFT aeroshell.

As shown in FIGS. 3A-3D, basic process components/steps for forming an LFT aeroshell (such as the embodiment in FIG. 2) involve hot melt impregnation of fibers with an engineered polymer (e.g., fiber strand 150, FIG. 3A) to produce long fiber pellets (e.g., pellet 160 of FIG. 3B). By way of example, poly aryl amide (PAA) polymer can be used to produce pellets of carbon/PAA. This can involve use of various devices, such as a take-up, a pelletizer, a puller, cooled rollers, an impregnation chamber, an extruder, a let-off and a chiller, as should be known to one of ordinary skill. For instance, multiple spools of fiber strands can be loaded onto a take-up, which feeds the strands to a puller. The puller controls the take-up speed and provides the strands to cooled rollers, which orient the strands in a flattened, side-by-side arrangement. The strands then pass through an impregnation chamber that communicates with an extruder, which receives the polymer. The polymer is coated onto the strands in the impregnation chamber, after which the impregnated strands are gathered by the let-off and subsequently cooled in the chiller and pelletized.

Figures 3C, 3D:
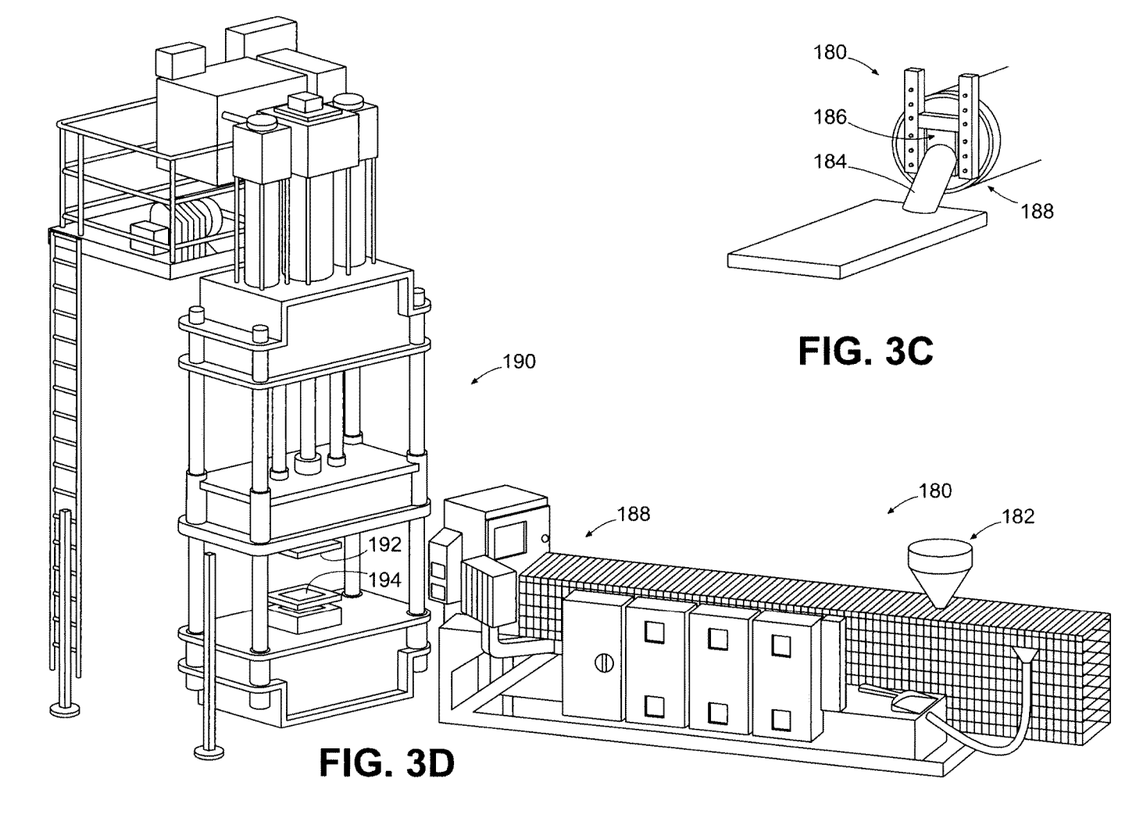

As shown in FIGS. 3C and 3D, a plasticator 180 receives long fiber pellets (such as through input 182) and produces a charge (e.g., charge 184) that is detached from other material of the plasticator via a knife 186 positioned at the output 188. The charge is then compression molded in a press 190 that includes upper and lower molds 192, 194.

Due to the thin walled geometry (approximately 0.070") of an LFT aeroshell and the high thermal conductivity of carbon fibers, there is an extremely small (narrow) processing window for producing high quality parts with tight tolerance and long fiber lengths. Specifically, long fiber reinforced thermoplastic composites have a thermoplastic matrix that melts over a melting temperature range and flows under pressure. Proper temperature is one of the most important factors during processing, especially for the high temperature material such as PAA (which is a modified nylon).

During manufacture of an aeroshell, temperature should be controlled on many levels—the temperature of the pellets as they work their way through the various molding steps, the resident time of the material in the plasticator, the mold temperature, the material temperature during molding, the cool down rate. In this regard, polymers retain heat during processing. However, carbon fibers dissipate heat. As such, the polymers can be thermally degraded when attempting to counteract the cooling effect due to the carbon fibers. With respect to a mold cavity, if heat is not properly managed, the polymer can degrade and lose its appearance, properties and function. Furthermore, carbon fibers are brittle and can be damaged if exposed directly to the plasticator screw surface or the mold walls. The protection of the carbon fibers by the polymer is important to minimize fiber breakage and fiber degradation during the plastication or the compression molding steps. The carbon fibers must flow to fill ribs, cut outs, steps and other intricate geometric features while retaining their starting fiber length to the extent possible.

The starting long fiber pellets disperse as thousands of filaments of fibers (the individual fiber diameter, usually is 8-12 microns, like a human hair) as they make their way through the extruder and the molding process. Heat and back pressure, if not managed properly, can cause individual fiber degradation.

Notably, high temperatures result in reduced viscosity and easier flow and fill in the mold cavity formed by the upper and lower molds. See, for example, FIG. 4, which depicts an unfilled quadrant of an embodiment of an aeroshell (the aeroshell of FIG. 4 was processed at a plasticator temperature of 610° F. and mold temperature of 250° F.). However, overheating can cause material degradation and result in reduced mechanical properties (See, for example, FIG. 5, the filled aeroshell of which was processed at a plasticator temperature of 640° F. and mold temperature of 290° F.). In contrast, FIG. 6 depicts a quadrant of an aeroshell that is filled and does not exhibit degradation (this aeroshell was processed at a material temperature 625° F. and mold temperature 275° F.).

Numerous process optimization, simulations and process trials varying material temperature, back pressure, mold temperature, consolidation pressure, charge volume and placement, fiber orientation, resident time in the plasticator, rate of press closure and minimized fiber length degradation have been conducted. Based on these interrelated parameters, processing parameters were determined to produce the aeroshells.

Due to the profile steps (i.e. complex geometry) of the aeroshell (for example, see top portion of the aeroshell in FIG. 6), it is important to place the plasticated fiber filled polymer charge at the optimum location in order to have adequate flow and fill of the mold cavity. The profile steps act as obstacles to the material flow during processing. Placing the charge 1" off center from the part, i.e. closer to the profile steps rather than at the aeroshell geometric center is suitable to obtain filled and high quality parts. In addition, a cylindrical or sheet shape charge should be placed in such orientation that its long axis is aligned with the rotation axis of the aeroshell. The processing parameters, such as temperature, were optimized for a cylindrical charge to produce filled and high quality parts.

High scrap rate (95%) occurred when the material soak time (material resident time) in the plasticator was less than 15 minutes. It is believed that the LFT pellets did not have enough time to fully disperse into individual fiber filament and therefore caused flow difficulty. A high percentage of unfilled parts resulted. However, using too long of a resident time (over 25 minutes) in the plasticator caused material degradation in the plasticator. The optimal material resident time was found to be around 20±5 minutes. This optimum time is a function of temperature, back pressure, and screw speed.

Due to the high thermal conductivity of the carbon fiber, the top and bottom mold must be brought together and pressure applied relatively quickly to the charge. In some embodiments, a closing rate of at least 600 inches/min (254 mm/sec) and press force of at least 300 metric tons has proven effective for molding.

Figure 4:
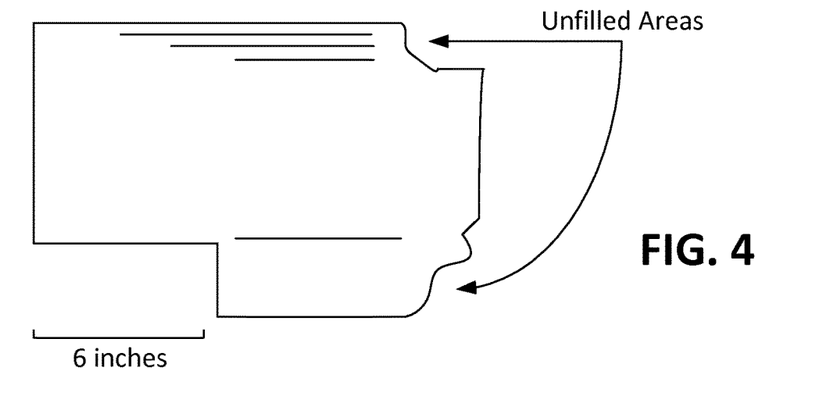
FIG. 4 depicts an unfilled quadrant of an embodiment of an aeroshell.
Figure 5:
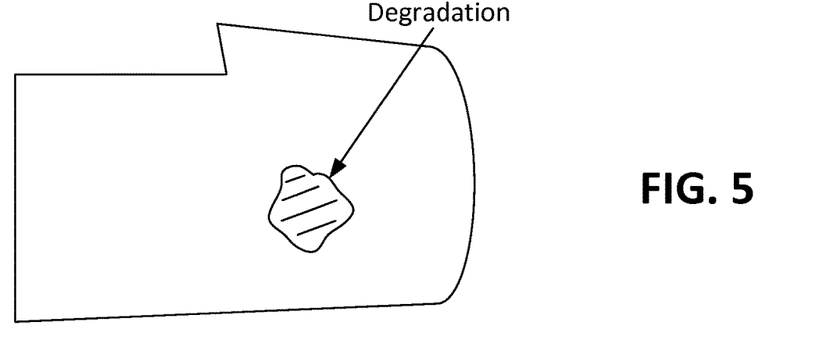
FIG. 5 depicts a filled quadrant of an embodiment of an aeroshell that exhibits degradation.
Figure 6:
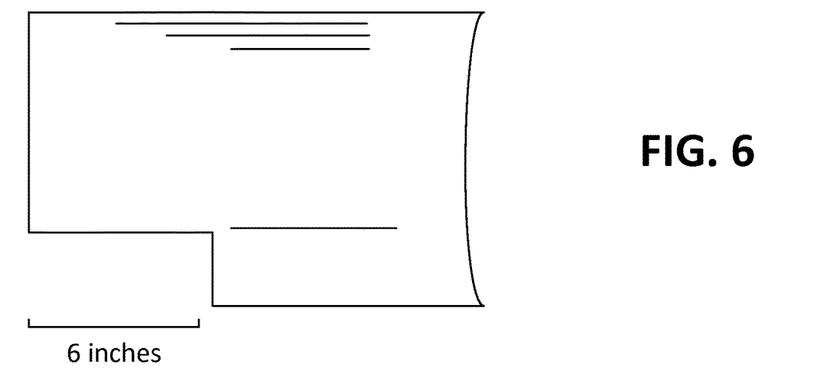
FIG. 6 depicts a filled quadrant of an embodiment of an aeroshell that does not exhibit degradation.
Figure 7:
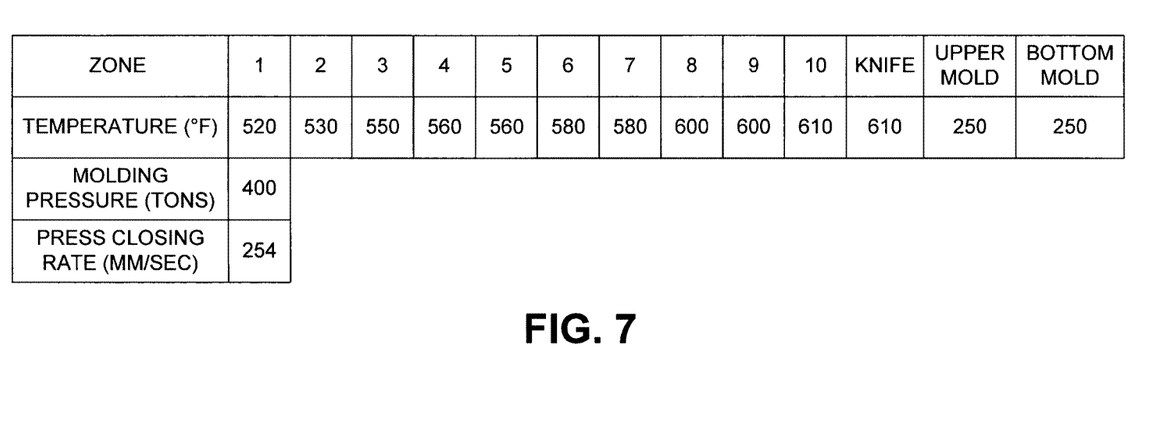
FIG. 7 is a table depicting parameters for the unfilled aeroshell of FIG. 4.
Figure 8:
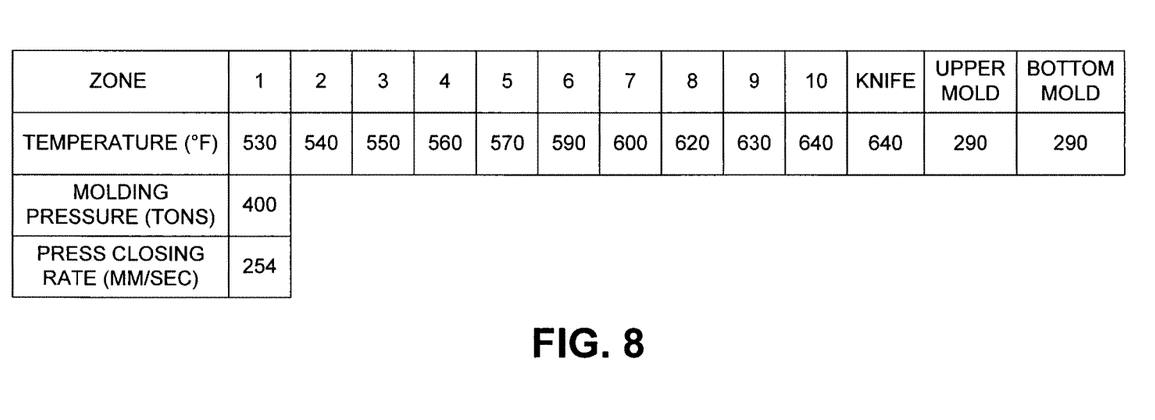
FIG. 8 is a table depicting parameters for the filled aeroshell with degradation of FIG. 5.
Figure 9:
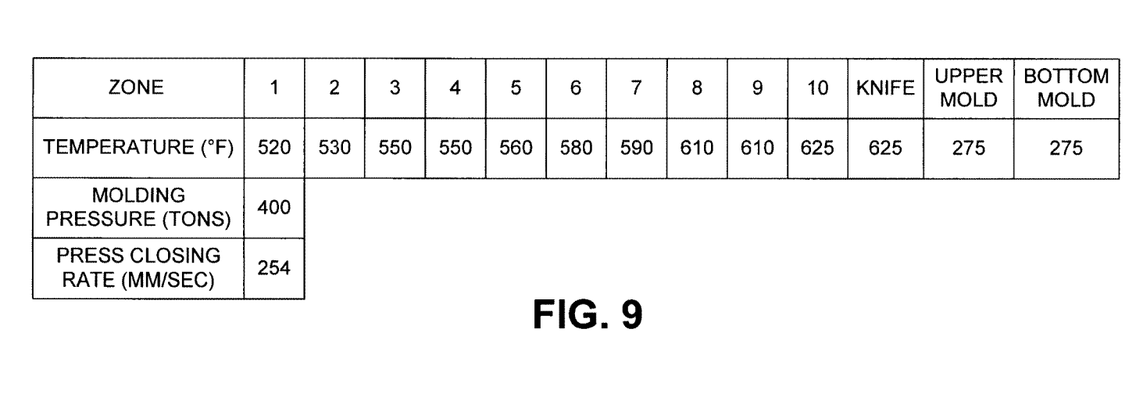
FIG. 9 is a table depicting parameters for the filled aeroshell without degradation of FIG. 6.

Process parameters for the aeroshells of FIGS. 4-6 are provided below for Zones 1 to 10 of the plasticator (numbered from the input to output of the plasticator), the heated knife of the plasticator and the upper and bottom compression mold. The values listed are for the specific plasticator used in production of the above parts and are representative values. Other temperature ranges, numbers of zones and similar parameters may be used. Parameters for the unfilled aeroshell as shown in FIG. 4 are presented in FIG. 7; parameters for the filled aeroshell with degradation are presented in FIG. 8; and parameters for the filled aeroshell without degradation are presented in FIG. 9.

ECM and IM processes for producing aeroshells use the same starting material—LFT pellets. However, ECM differs from IM in terms of forming pressure and temperature involved during processing. In ECM, the plasticated charge is placed in a compression press and molded to shape in cycle times ranging from 45 seconds to 3 minutes depending upon the size of the part. The male mold and female mold cavity are open and separated with respect to each other during placement of the fiber-polymer charge. The closing action of the compression press brings the two mold halves towards each other as the part gets formed. In IM, the plasticated charge is forced through an injection head through a series of gates into a fixed cavity mold. Since the mold cavity is fixed, the material is subjected to high shear forces in the injection head/nozzle. Fiber length reduction is greater in IM because of the shearing of the fibers along the walls of the injection head. The part is formed as the fiber filled charge flows and fills the cavity. The part can be produced in 45 seconds to 3 minutes depending upon the size of the part.

Thermal and Mechanical Properties

The thermal conductivity of the 30% C-PAA LFT has been measured to be 0.4 W/m K, which is an order of magnitude less than the thermal conductivity of aluminum. The other carbon LFT materials have similar thermal conductivity. The low thermal conductivity of the composites aeroshell helps to shield TCK electronics from the heat generated from outside surface of the aeroshell during flight.

Figure 10:
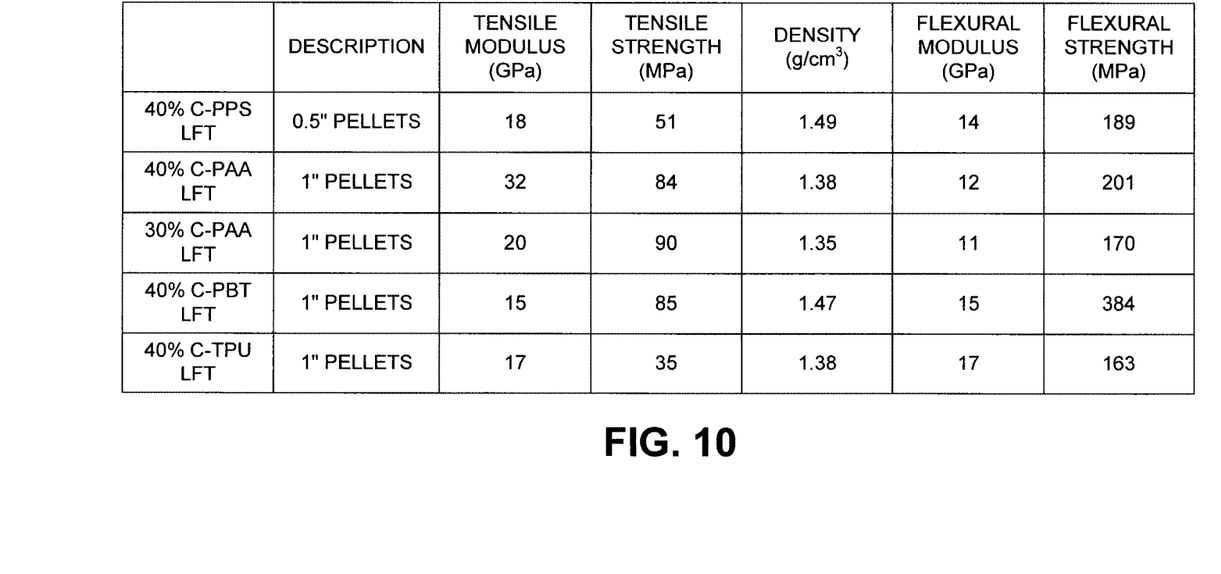
FIG. 10 is a table depicting mechanical properties of LFT materials for an embodiment of an aeroshell.

The mechanical properties of the LFT materials for an embodiment of an aeroshell are listed in FIG. 10.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of this disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. An aeroshell for a missile formed of a long fiber thermoplastic composite comprising a polymer matrix and a plurality of discontinuous fibers, the aeroshell formed by at least one of extrusion-compression molding or injection molding, the aeroshell exhibiting a wall thickness in a range of 0.070 inches±0.030 inches, wherein the aeroshell is cylindrical and the aeroshell exhibits a substantially circular cross section.

2. The aeroshell of claim 1, wherein the long fiber thermoplastic composite exhibits a fiber weight fraction in a range of about 10% to 50%.

3. The aeroshell of claim 1, wherein the long fiber thermoplastic composite exhibits a fiber weight fraction in a range of about 20% to 40%.

4. The aeroshell of claim 1, wherein the long fiber thermoplastic composite exhibits a fiber weight fraction of about 30%.

5. The aeroshell of claim 1, wherein the long fiber thermoplastic composite exhibits fiber lengths ranging from about 10 to 50 mm.

6. The aeroshell of claim 1, wherein the long fiber thermoplastic composite exhibits fiber lengths ranging from about 10 to 25 mm.

7. The aeroshell of claim 1, wherein the plurality of discontinuous fibers comprise carbon fibers.

8. The aeroshell of claim 1, wherein the polymer matrix comprises polyarylamide.

9. The aeroshell of claim 1, wherein the aeroshell is formed by long fiber thermoplastic extrusion-compression molding (ECM).

10. The aeroshell of claim 1, wherein the aeroshell is formed by long fiber thermoplastic injection molding (IM).

11. An aeroshell for a missile formed of a long fiber thermoplastic composite, the long fiber thermoplastic composite exhibiting a fiber weight fraction in a range of about 10% to 50% and fiber lengths ranging from about 10 to 25 mm.

12. The aeroshell of claim 11, wherein the aeroshell has a substantially circular cross section.

13. The aeroshell of claim 11, wherein the aeroshell is formed of four longitudinal sections.

14. The aeroshell of claim 13, wherein:
the aeroshell further comprises mechanical fasteners; and
adjacent ones of the longitudinal sections are joined by the mechanical fasteners.

15. A method for manufacturing an aeroshell for a missile comprising:
providing a charge of a long fiber thermoplastic composite, wherein the charge is a fiber filled polymer charge and cylindrical shaped; and
forming the aeroshell with the long fiber thermoplastic composite such that the aeroshell exhibits a wall thickness in a range of 0.070 inches±0.030 inches.

16. The method of claim 15, wherein forming the aeroshell comprises using extrusion-compression molding.

17. The method of claim 15, wherein forming the aeroshell comprises using injection molding.

18. The method of claim 15, wherein, in forming the aeroshell, the long fiber thermoplastic composite is processed at a material temperature of about 625° F. and a mold temperature of about 275° F.

19. The method of claim 15, wherein forming the aeroshell further comprises:
providing an upper mold and a lower mold; and
aligning a longitudinal axis of the charge with a longitudinal axis of the upper and lower molds prior to compressing the charge with the molds.

* * * * *

UNITED STATES PATENT AND TRADEMARK OFFICE
CERTIFICATE OF CORRECTION

PATENT NO. : 10,012,488 B2
APPLICATION NO. : 14/288640
DATED : July 3, 2018
INVENTOR(S) : Vaidya et al.

Page 1 of 1

It is certified that error appears in the above-identified patent and that said Letters Patent is hereby corrected as shown below:

In the Specification

At Column 1, Lines 18-24 delete:
"The U.S. Government may have an interest in the subject matter of this disclosure as provided for by the terms of U.S. Army Research Lab Cooperative Agreement W911 NF-04-2-0018 and contract number W31 P4Q-08-0039 awarded by U.S. Army Aviation and Missile Research Development and Engineering Center."

And replace with:
--This invention was made with government support under grant number W911NF-04-2-0018 awarded by the United States Army Research Laboratory. The government has certain rights in the invention.--

Signed and Sealed this
Nineteenth Day of May, 2020

Andrei Iancu
*Director of the United States Patent and Trademark Office*